Feb. 16, 1943.  T. ULRICH  2,311,419
SPRING SUSPENSION FOR CHASSIS
Filed Oct. 16, 1939   2 Sheets-Sheet 1
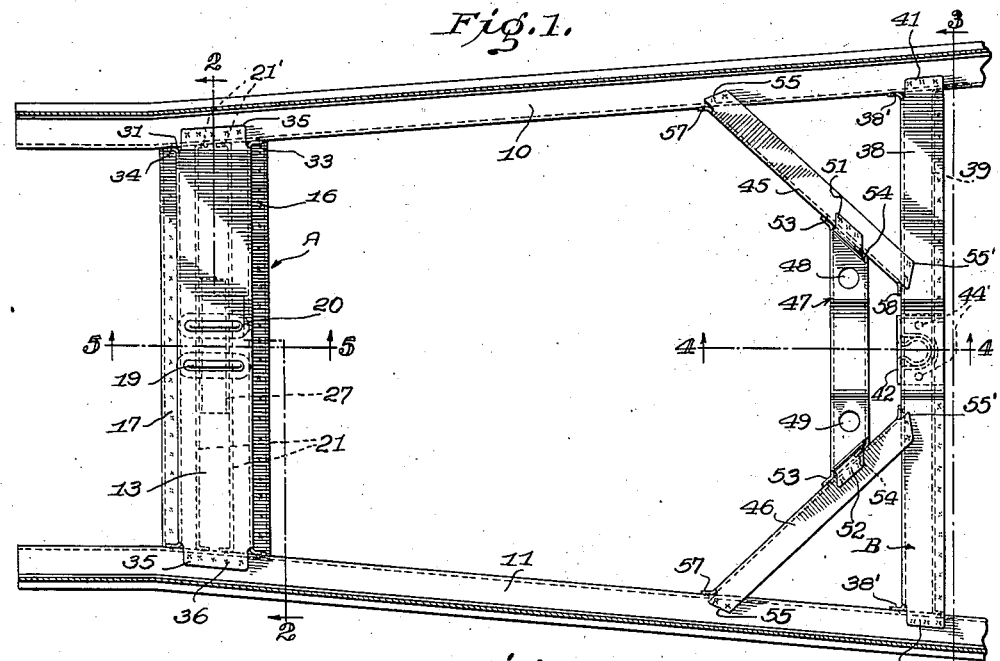
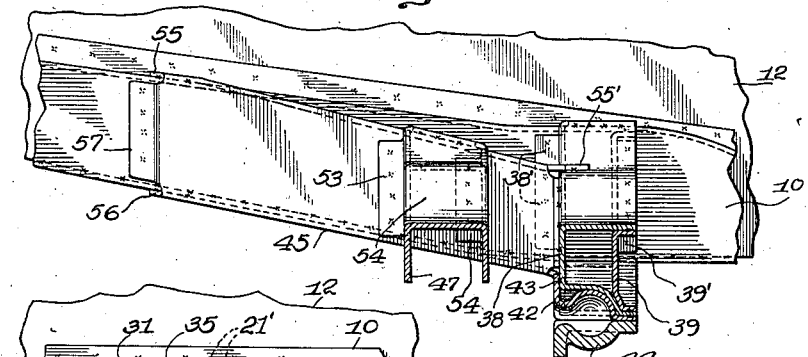
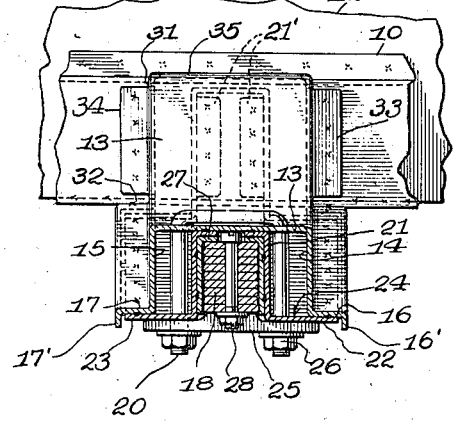
INVENTOR.
Theodore Ulrich
BY John P. Tarbox
ATTORNEY.

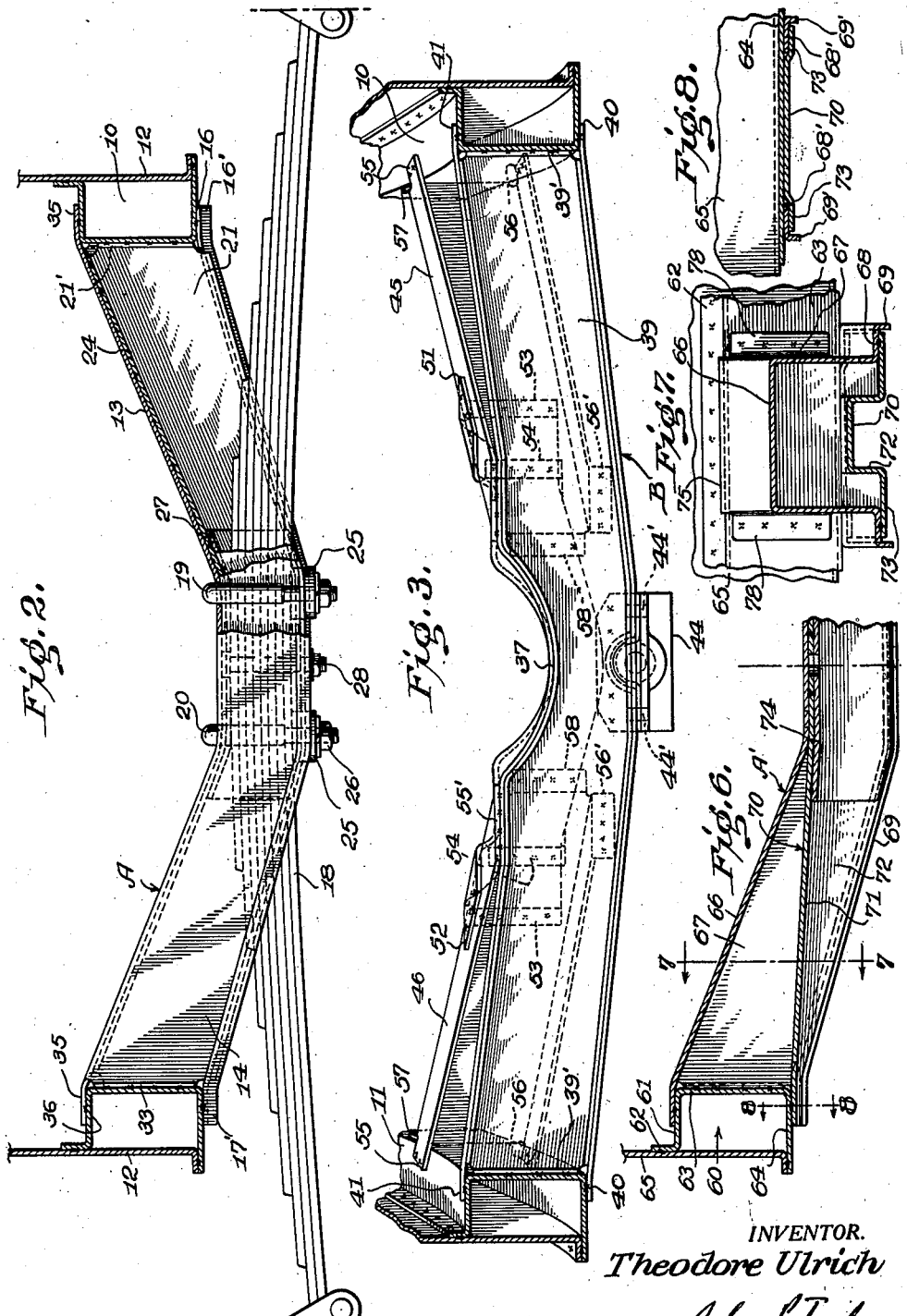

Patented Feb. 16, 1943

2,311,419

UNITED STATES PATENT OFFICE 2,311,419

SPRING SUSPENSION FOR CHASSES

Theodore Ulrich, Detroit, Mich., assignor to Edward G. Budd Manufacturing Company, Philadelphia, Pa., a corporation of Pennsylvania Application October 16, 1939, Serial No. 299,594

15 Claims. (Cl. 280—106.5)

This invention in general relates to automobile chassis construction and front spring suspension means therefor.

The principal object of the invention is to provide an improved method and means for fastening together certain component parts of an automobile chassis, and for applying the transverse front spring to the latter in such wise as to assure increased rigidity and strength, and a more equalized distribution of the body load.

Another object is the provision of an automobile chassis construction and front spring suspension therefor, of a design affording increased resistance to all stresses including static, torsional and shock loads, as well as side thrust and shearing stresses.

A further object is to provide a chassis construction adapted to dissipate loads over comparatively large areas of the main chassis supporting members, and to strengthen those sections nearest the center line of the body where stresses from the front spring, motor and radius rods are absorbed.

A still further object is the adaptation of a transverse type of front spring suspension to an automobile chassis with a view to a more facile production and assembly, and an improved operation.

With the foregoing and other objects in view which will appear as the description proceeds, the invention resides in the combination and arrangement of parts, and in the details of construction hereinafter described and claimed, it being understood that various changes in the precise embodiment of the invention herein disclosed may be made within the scope of what is claimed without departing from the spirit thereof.

The invention will be best understood by reference to the drawings wherein:

Figure 1 is a fragmentary plan view of an automobile chassis showing the general relation of the front reinforcing and supporting cross assemblies to the main frame chassis extensions.

Fig. 2 is a transverse sectional view, taken on the line and as viewed in the direction of the arrows 2—2 of Fig. 1, certain parts being shown in elevation; and illustrating the relation of the transverse front spring to the adjacent front cross member:

Fig. 3 is a transverse sectional view, taken on the line and as viewed in the direction of the arrows 3—3 of Figure 1, showing the other or intermediate cross member together with coacting supporting and fastening means;

Fig. 4 is a sectional view taken on the line and as viewed in the direction of the arrows 4—4 of Figure 1, showing certain component parts of the rear engine supporting means and the securing of the radius rod socket member to the rear cross member; and Fig. 5 is a sectional view, taken on the line and as viewed in the direction of the arrows 5—5 of Figure 1; showing the reinforcement of the front cross member by the spring support, the method of attaching the said member to the main frame extensions, and the attachment of the transverse spring to the said front cross member.

Fig. 6 is a transverse sectional view of one-half of a modified form of the front cross member, the view being similar to the right-hand view of Figure 2, the spring and the fastening means therefor being omitted.

Figs. 7 and 8 are fragmentary sectional views along lines 7—7 and 8—8, respectively, of Figure 6.

Referring more particularly to the drawings wherein similar characters of reference indicate corresponding parts in the several views of the preferred form of the invention, the numerals 10, 11 designate the main frame front extensions of an automobile chassis, which are welded or otherwise suitably fastened to the adjacent portions of the main body side panels, indicated generally at 12.

Transversely arranged between and having its extremities welded to adjacent portions of the front chassis extensions 10, 11, as hereinafter described, is a front cross member, designated generally at A, and comprising a channel member having a central web 13 provided with side walls 14, 15 formed with laterally-extending angle flanges 16, 17 and narrow down-turned flanges 16', 17'.

At its horizontal midsection, the member A is secured to the transverse front spring 18 by clips or stirrups 19, 20 whose ends are passed through holes in flanges 22, 23 of the side walls 21 of a U-shaped spring support or member 24 which is arranged substantially concentric with the member A. The threaded ends of the clips 19, 20 are further protruded through registering holes in a spring-supporting pad or retainer plate 25 whereon the spring 18 is seated. Nuts 26 on the threaded end of the clips 19, 21 serve to clamp the spring 18, retainer plate 25 and cross member A securely together.

The spring 18 itself is embraced at its midsection by a channel member 27 which serves as a reinforcement for the spring supporting member 24, and its leaves are clamped together in operative relation by a screw bolt and nut as at 28. By inspection of Fig. 5, it will be seen that the U-shaped support 24 and the spring support reinforcement member 27 form together with the channel member 13 to 17 substantially a double box section which is strongest at points of greatest stress.

The cross member A, from its horizontal mid-section, extends diagonally upward, to the left and to the right, as viewed in Fig. 2. The side walls 14, 15 of this member, adjacent their opposite ends and at their junction with the web 13, and also their respective flanges 16, 17, at the said opposite ends, are slit, as at 31, 32; thereby permitting the extension of the said flanges beneath and their welding to the front chassis extensions 10, 11 (Fig. 2). The ends of the side walls 14, 15, it will now be observed, may be bent off laterally to form transversely positioned reinforcing abutments or flanges 33, 34 which are welded to the adjacent faces of the front extensions 10, 11. The bending off of the ends of the side walls 14, 15 further provides a projection of tongue 35 on the end of the web portion 13 at each end thereof, which in turn is adapted to seat on and be welded to the top of the adjacent front extensions 10, 11 as at 36.

The members 13 to 17, 24 and 27 are rigidly connected to each other as by spot welding in the regions where portions of their walls or flanges overlap each other. Flanges 21' are bent off from the walls 21 of the member 24 and are rigidly connected as by spot welding to the inner vertical walls of the sill members 10, 11.

The front chassis extensions 10, 11, by the above-described construction are welded on three of their sides to the front cross member A and the inner member 24 in such wise as to assure a rigid, reinforced construction with maximum resistance to stress and strain at areas adjacent the center line of the body. The loads also are distributed over large areas of the said front extensions.

A second cross member or assembly, designated generally at B and illustrated more fully in detail in Figs. 3 and 4, is arranged transversely to the extensions 10, 11 and has its opposite extremities welded to the said extensions, as described more fully hereinafter.

The die-stamped cross member B, which in cross section presents a somewhat box-like configuration, is formed with a depressed central portion 37 to which the radius rod ball socket member, hereinafter described, is connected.

The member B consists of two rearwardly facing channel members 38 and 39 which are telescoped into each other and have their side walls rigidly connected as by spot welding so that they form a closed box sectional sill. The walls of this sill are provided at their ends with laterally bent-off flanges 38', 39' or extensions 40, 41, which flanges and extensions overlap and are fastened as by spot welding to the walls of the side sill member 10, 11.

The central depressed portion 37 of the member B, is shaped on its under side to accommodate the upper half or semi-spherical portion 42 of the radius rod ball socket member mentioned above, which latter is welded as at 43 to the adjacent surfaces of the member B. The ball socket member further includes a coacting semi-spherical lower half portion or member 44 suitably fastened to the upper half in order to accommodate the radius rod ball (not shown). The clamping together of the socket members 42 and 44 may be effected by bolts (not shown) passing through the holes 44' which are provided in the two members.

Rigidly fastened to the member B, as hereinafter described, is a pair of engine bearer gusset plates 45, 46 between which is secured the rear engine support or channel member 47 having holes 48, 49 to receive the engine bearer elements (not shown). The member 47 is slit at either end in a manner similar to the method described above in connection with the members A and B, to provide flanges 51, 52 and angularly positioned abutments or flanges 53, 54 which are welded to the adjacent surfaces of the gusset bearers 45, 46. The engine bearer gussets 45, 46 which are also of channel construction, are in turn slit at their opposite ends to provide projecting top and bottom flanges or extensions 55, 56 and 55', 56', which are welded to the chassis extension members 10, 11 and to the member B and have in addition angularly positioned abutments or flanges, as at 57, 58 which are welded respectively to the adjacent front chassis extensions and to the cross member B.

The mechanical and engineering advantages accruing to the construction above described and illustrated have been in large measure pointed out in the foregoing paragraphs, but it may be further pointed that the design and coordination of the respective elements makes possible the use of light gauge stampings without sacrifice of strength. This is particularly noticeable in the cross member A whose spring support 24 and spring support reinforcement member 27 form together with the outer member 13 to 17 a double box section. The dissemination of loads over comparatively wide areas of the front chassis extensions also contribute to the general rigidity of the construction. Effective silencing of the system against road noise and vibration is accomplished by proper insulation (not shown) for instance at the spring connecting region, at the ends of the cross member A, at the ball end of the radius rods or the radius rod ball socket member.

In the embodiment shown in Figures 6, 7 and 8, 60 designates in general one of the two side sills. This sill comprises a member having an upper wall 61 with an upstanding flange 62, an inner wall 63, and a lower wall 64. The so formed outwardly opening channel is closed by the body or wheel housing panel 65. The cross member A' consists again of a downwardly facing channel having a bottom wall 66, downwardly extending side walls 67, lateral flanges 68 and downwardly extending flanges 69. This channel houses a second channel 70 comprising a bottom wall 71, downwardly extending side walls 72 and laterally extending flanges 73, the flanges 73 underlying and being fastened as by spot welding to the flanges 68 of the member A'. The middle portion of this structure is additionally reinforced by a channel member 74 which corresponds to the member 27 of the first embodiment. It is obvious that the cross section of the aggregate cross member structure is in its central portion about the same as shown for the first embodiment in Figure 5. For this reason it is not necessary to show a cross section of the central part of the spring and its fastening means of this second embodiment.

The second embodiment differs from the first embodiment therein that the height of the side walls 71 of the inner member 70 diminishes from the center line toward the side sill structure 60 so that the bottom wall 71 underlies the wall 64 of the side sill and may be fastened thereto as by spot welding. The flanges 68 and 69 are, as the corresponding parts of the first embodiment, extended outwardly at 68' and 69', and those extensions underlie and are fastened to the under side of the sill wall 64. The flanges 73 of the inner member extend outwardly as to overlie the extension 68' of the outer member. In this second embodiment, the cross member structure has a double box-section in its central portion just as in the case of the first embodiment. The end sections of the cross member according to this second embodiment show a single closed box-sectional structure which has, however, a very great cross sectional area and a correspondingly great strength. The strength is additionally increased thereby that the bottom wall 70 of the inner member is anchored to the bottom wall 64 of the side sill 60.

The sill extensions 10, 11 or 60 and the side panel portions 12 or 65 are supported to form portions of a combined body and chassis structure. The features of the invention may, however, be applied to ordinary chassis constructions which are adapted to support a separately manufactured body. Where the expression chassis is used in this specification or in the following claims, it is meant in its broadest sense, that means as to include regular chassis structures as well as combined chassis and body structures or so-called self-supporting body structures. It is, furthermore, obvious that the invention is not restricted to the construction of the front end of an automobile but that the invention might also be applied to rear spring suspension especially in cases where the motor is arranged at the rear end of the vehicle. Most of the members shown in the embodiments are, of course, sheet metal stampings with the exception of such members as the spring 18, the clips 19, 20, the nuts and bolts 26, 28, the plate 25 and perhaps the socket member 44. However, certain of those sheet metal stampings might be made from other material and manufactured in other ways.

It is to be understood that the invention is susceptible to some variation and modification, and it is therefore desired that the present embodiment be considered in all respects as illustrative and not restrictive, reference being had to the appended claims rather than to the foregoing description to indicate the scope of the invention; and it will be further understood that each and every novel feature and combination present in or possessed by the mechanism herein disclosed forms a part of the invention included in this application.

What I claim is:

1. In a vehicle frame, side sill members, a cross member presenting substantially in cross section a U-shape and having a web, side walls integral with the web and angularly positioned flanges on the side walls; a transverse front spring arranged within a central portion of the member, screw means and a plate for securing the spring to the member, and other means concentric with the member and forming therewith a substantially double box section at its central portion for reinforcing it.

2. In an automobile, side sills and a cross brace interconnecting said side sills, said cross brace comprising a first channel-formed member and a second channel-formed member, said two members being telescoped into each other as to have their open sides face in the same direction, the space between the upper walls of said two members being gradually increasing from the middle portion of the brace toward said side sills, these two upper walls being fastened at points spaced from each other to said side sill members.

3. In an automobile underframe construction; side sill members; an end cross member between said side sill members; an intermediate cross member between said side sill members being longitudinally spaced from said end cross member; said end cross member having a plurality of flanges at either end thereof, said flanges being welded to the sill members, a channel in the end cross member being adapted to accommodate a central portion of a transverse spring, and means concentrically located within the channel of the member for reinforcing it; said intermediate cross member comprising a radius rod socket, means on said intermediate cross member including top and bottom flanges and side flanges for fastening it to the side sill members; and other means adapted for supporting an engine on the underframe structure, said last-mentioned means reinforcing the side sill members, the intermediate cross member and the connection between both; said side sill members, said two cross members and said last-mentioned means forming together a rigid end portion of the underframe structure and being adapted respectively for the support of an engine and of the spring attachment.

4. In an automobile underframe structure; side sill members and a pair of cross braces interconnecting said side sill members and being spaced from each other in the longitudinal direction of the automobile; said cross braces each comprising two U-section members being telescoped into each other so that their open sides face in the same direction; the members constituting the one cross brace facing downwardly so as to be adapted to accommodate a transverse leaf spring, the space between the upper walls of the two members constituting the last-mentioned cross brace being gradually increased from the middle portion of the brace toward said side sill members and the said two upper walls being fastened at points spaced from each other to said side sill members; the members constituting the other cross brace facing in the longitudinal direction of the automobile; this other cross brace being provided with means for receiving the end of radius rods; diagonal braces being inserted between said other cross member and the side sill members and being provided with means for supporting the engine of the automobile; said side sill members, said cross braces, and said diagonal means constituting together a rigid unitary structure surrounding the space for the engine.

5. In a vehicle construction, side sill members, a first transverse member U-shaped in cross-section interconnecting said side sill members, a second transverse member U-shaped in cross-section facing in the same direction as, being of less width than and being located in the interior of said first transverse member, connecting means between the margins of the side walls of said two transverse members so that said means and said transverse members constitute together a hollow closed box-sectional transverse sill structure having a large portion of the box section located between the side walls of the two transverse members and presenting an open channel adapted for the reception of a spring.

6. In a vehicle frame, two sill members generally U-shaped in cross-section, the outer width of one of said members being less than the inner width of the other member, the member of less width being located in the interior of the other member, both members having their open sides facing in the same direction, the difference between said widths being of such magnitude as to leave a space between the side walls of the two sill members, connecting means between the margins of the two members so as to form a box-sectional hollow sill structure, main portions of the box section extending into the space between the side walls of the two sill members.

7. In a vehicle frame, a sill structure comprising two U-sectional members telescoped into each other, the two members facing in the same direction, the outer width of the inner member being substantially less than the inner width of the outer member, at least one of the members being provided with marginal flanges connected to marginal portions of the other member so as to form a hollow box-sectional closed structure, at least a large portion of the box section being formed between the side walls of said two members.

8. In a vehicle frame, two U-sectional sill members the one arranged substantially in the interior of the other, both members facing in the same direction, the width of the one member being substantially less than the width of the other member and both members being provided with lateral marginal flanges, said flanges overlapping and being connected to each other so as to complete a hollow closed box-sectional sill structure having an outwardly facing channel of such depth and width as to be adapted for the reception of an accessory such as a spring.

9. In a vehicle frame, two sill members U-shaped in cross-section, the depth of the two members being substantially equal over at least part of their lengths but the width of the one member being substantially greater than that of the other member, the member of smaller width being arranged in the other member so that the mouths of both members face in the same direction, means bridging the spaces between the margins of the two members so that the members together with said means form a double box-sectional hollow structure.

10. In a vehicle such as a motor vehicle, a frame structure having an inverted channel cross member with outwardly extending front and rear edge portions, an inverted channel carrier substantially coextensive with and nested in said cross member, said carrier having outwardly extending front and rear edge portions extending below and parallel with the edge portions of said cross member, means anchoring said parallel edge portions together, and a transversely extending leaf spring lying within and fixed to the central portion of said carrier.

11. In a vehicle such as a motor vehicle, a frame structure having an inverted channel cross member with outwardly extending front and rear edge portions, an inverted channel carrier substantially coextensive with and nested in said cross member, said carrier being of such depth and width as to be adapted for the reception therein of a multi-layer leaf spring, means anchoring the edge portions of the carrier to the outwardly extending edge portions of the cross member, and a transversely extending leaf spring lying within and fixed to the central portion of said carrier.

12. In a vehicle such as a motor vehicle, a frame structure having an inverted channel cross member, an inverted channel carrier substantially coextensive with and nested in said cross member, said carrier having outwardly extending front and rear edge portions extending below and substantially parallel with the lower edge portions of said cross member, means anchoring said parallel edge portions of said cross member and of said carrier together, and a transversely extending leaf spring lying within and fixed to the central portion of said carrier.

13. In a vehicle such as a motor vehicle, a frame structure having an inverted channel cross member, an inverted channel carrier substantially coextensive with and nested in said cross member, said carrier being of such depth and width as to adapt it for the reception of a leaf spring therein, the inner width of said cross member being so much greater than the outer width of said carrier as to leave a space between the side walls of the member and the carrier, means anchoring the edge portions of the carrier to the edge portions of the cross member, and a transverse leaf spring lying within and being fixed to the central portion of said carrier.

14. In a vehicle such as a motor vehicle, a frame structure having an inverted channel cross member, an inverted channel carrier at least partly coextensive with and nested in said cross member, said carrier being of such depth and width as to adapt it for the reception of a leaf spring therein, the inner width of said cross member being so much greater than the outer width of said carrier as to leave a space between the side walls of the member and the carrier, means anchoring the edge portions of the carrier to the edge portions of the cross member, and a transverse leaf spring lying within and being fixed to the central portion of said carrier.

15. In a vehicle frame, a closed box-section sill structure, said structure presenting as a whole a U in cross section, the interior of the U being of such depth and width as to adapt it for the reception of a vehicle accessory such as a leaf spring, large portions of the box section being formed by the arms of the U section.

THEODORE ULRICH.